United States Patent
Lim et al.

(10) Patent No.: US 9,860,048 B2
(45) Date of Patent: Jan. 2, 2018

(54) METHOD AND USER EQUIPMENT FOR TRANSMITTING UPLINK SIGNAL ACCORDING TO SPECTRUM EMISSION MASK

(71) Applicant: LG ELECTRONICS INC., Seoul (KR)

(72) Inventors: Suhwan Lim, Seoul (KR); Yoonoh Yang, Seoul (KR); Sangwook Lee, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/039,285

(22) PCT Filed: Dec. 9, 2014

(86) PCT No.: PCT/KR2014/012044
§ 371 (c)(1),
(2) Date: May 25, 2016

(87) PCT Pub. No.: WO2015/093772
PCT Pub. Date: Jun. 25, 2015

(65) Prior Publication Data
US 2017/0163399 A1    Jun. 8, 2017

Related U.S. Application Data

(60) Provisional application No. 61/917,355, filed on Dec. 18, 2013, provisional application No. 61/925,242, filed on Jan. 9, 2014.

(51) Int. Cl.
*H04B 7/00*    (2006.01)
*H04Q 7/20*    (2006.01)
(Continued)

(52) U.S. Cl.
CPC .......... *H04L 5/0066* (2013.01); *H04B 15/00* (2013.01); *H04L 5/001* (2013.01)

(58) Field of Classification Search
CPC ........ H04L 5/0066; H04L 5/001; H04B 15/00
See application file for complete search history.

(56) References Cited

U.S. PATENT DOCUMENTS

2007/0147226 A1 * 6/2007 Khandekar .......... H04L 5/0044
                                                          370/208
2010/0091919 A1    4/2010 Xu et al.
(Continued)

FOREIGN PATENT DOCUMENTS

KR    10-2009-0074824 A    7/2009
KR    10-2011-0134305 A    12/2011

OTHER PUBLICATIONS

3GPP TR 36.827 V11.0.0 (Mar. 2012); 3rd Generation Partnership Project; Technical Specification Group Radio Access Network; Evolved Universal Terrestrial Radio Access (E-UTRA); LTE Advanced Carrier Aggregation Band 41 (Release 11), pp. 1-32.
(Continued)

*Primary Examiner* — Nguyen Vo
(74) *Attorney, Agent, or Firm* — Birch, Stewart, Kolasch & Birch, LLP

(57) ABSTRACT

One embodiment of the present specification provides a method by which user equipment (UE) transmits an uplink signal according to a spectrum emission mask (SEM). The method comprises a step of transmitting the uplink signal on a plurality of carriers when an RF unit of the UE is set to use inter-band carrier aggregation. Here, when the frequency range of a first SEM of a first carrier overlaps the frequency range of a second SEM of a second carrier, any one SEM allowing a higher power spectral density (PSD) can be selected and applied.

8 Claims, 24 Drawing Sheets

(51) Int. Cl.
    *H04L 5/00*      (2006.01)
    *H04B 15/00*     (2006.01)

(56) References Cited

U.S. PATENT DOCUMENTS

2013/0107809 A1    5/2013   Ko et al.
2016/0242128 A1*   8/2016   Loehr ................ H04W 52/365

OTHER PUBLICATIONS

3GPP TS 36.101 V12.1.0 (Sep. 2013); 3rd Generation Partnership Project; Technical Specification Group Radio Access Network; Evolved Universal Terrestrial Radio Access (E-UTRA); User Equipment (UE) radio transmission and reception (Release 12), pp. 1-470.

Yonis et al., "Effective Carrier Aggregation on the LTE-Advanced Systems", International Journal of Advanced Science and Technology, vol. 41, Apr. 2012, pp. 15-26.

* cited by examiner (a)

(b)

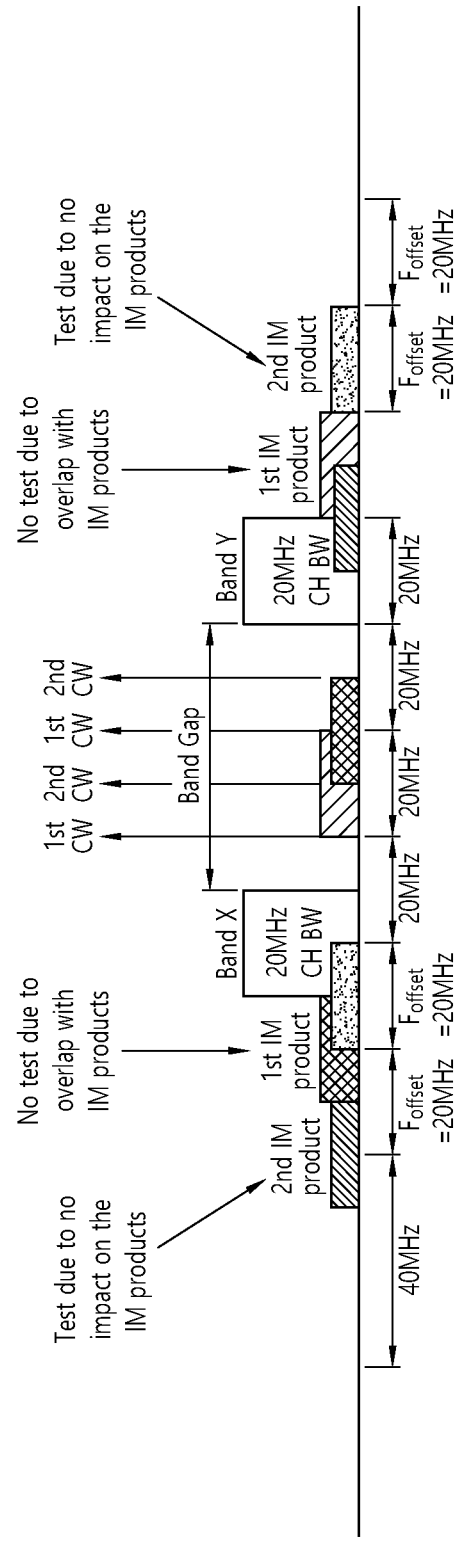

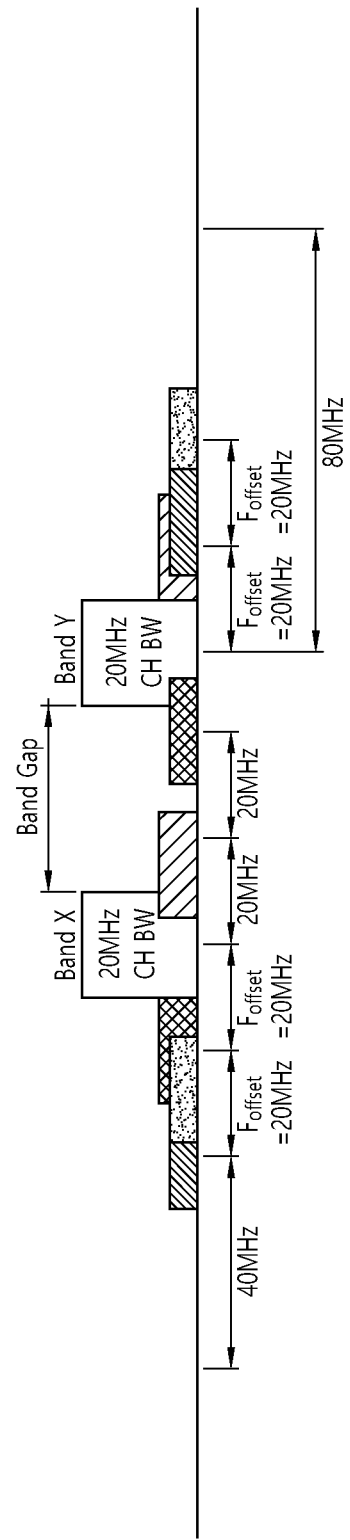

METHOD AND USER EQUIPMENT FOR TRANSMITTING UPLINK SIGNAL ACCORDING TO SPECTRUM EMISSION MASK

CROSS REFERENCE TO RELATED APPLICATIONS

This application is the National Phase of PCT International Application No. PCT/KR2014/012044, filed on Dec. 9, 2014, which claims priority under 35 U.S.C. 119(e) to U.S. Provisional Application No. 61/917,355, filed on Dec. 18, 2013, and U.S. Provisional Application No. 61/925,242, filed on Jan. 9, 2014, all of which are hereby expressly incorporated by reference into the present application.

BACKGROUND OF THE INVENTION

Field of the Invention

The present invention relates to mobile communications, for example, a terminal for LTE-A.

Related Art

3GPP (3rd Generation Partnership Project) LTE (Long Term Evolution) that is an advancement of UMTS (Universal Mobile Telecommunication System) is being introduced with 3GPP release 8.

In 3GPP LTE, OFDMA (orthogonal frequency division multiple access) is used for downlink, and SC-FDMA (single carrier-frequency division multiple access) is used for uplink. To understand OFDMA, OFDM should be known. OFDM may attenuate inter-symbol interference with low complexity and is in use. OFDM converts data serially input into N parallel data pieces and carries the data pieces over N orthogonal sub-carriers. The sub-carriers maintain orthogonality in view of frequency. Meanwhile, OFDMA refers to a multiple access scheme that realizes multiple access by independently providing each user with some of sub-carriers available in the system that adopts OFDM as its modulation scheme.

FIG. 1 illustrates a 3GPP LTE wireless communication system.

As can be seen from FIG. 1, the wireless communication system includes at least one base station (BS) 20. Each base station 20 offers a communication service in a specific geographical area (generally denoted cell) 20a, 20b, and 20c.

At this time, communication from the base station to a terminal is denoted downlink (DL), and communication from the terminal to the base station is denoted uplink (UL).

In case that base stations of several service carriers are existed in each geographic areas 20a, 20b and 20c, interferences may occur between the base stations.

In order to eliminate this interference, respective service carriers may provide services using different frequency bands.

However, when the frequency bands of the respective service carriers are adjacent to each other, an interference problem still remains.

SUMMARY OF THE INVENTION

Accordingly, disclosures of the present specification aim to limit interference which leaks to an adjacent band. More specifically, the disclosures of the present specification aim to limit unwanted emission which leaks to an adjacent band when using inter-band carrier aggregation.

To achieve the aforementioned aim, one disclosure of the present specification provides a method for transmitting an uplink signal according to a spectrum emission mask (SEM). The method may be performed by a user equipment (UE) and comprise: if a RF unit of the UE is configured to use inter-band carrier aggregation (CA), transmitting uplink signals on the carriers. Here, if a frequency region of a first SEM of a first carrier is overlapped with a frequency region of a second SEM of a second carrier, one SEM allowing a higher power spectral density (PSD) is selected thereby to be applied.

To achieve the aforementioned aim, one disclosure of the present specification provides user equipment for transmitting an uplink signal according to a spectrum emission mask (SEM). The user equipment may comprise: a radio frequency (RF) unit configured to transmit uplink signals on the carriers if the RF unit of the UE is configured to use inter-band carrier aggregation (CA). Here, if a frequency region of a first SEM of a first carrier is overlapped with a frequency region of a second SEM of a second carrier, one SEM allowing a higher power spectral density (PSD) is selected thereby to be applied.

If the frequency region of the first SEM of a first carrier is not overlapped with the frequency region of the second SEM of a second carrier, both the first SEM and the second SEM may be applied.

If the first carrier corresponds to 3GPP standard based E-UTRA band 1 and if the second carrier corresponds to 3GPP standard based E-UTRA band 5, then a maximum level of spurious emission is −50 dBm for protecting other UE using at least one of 3GPP standard based E-UTRA bands 1, 3, 5, 7, 8, 22, 28, 31, 34, 38, 40, 42 and 43 in order to apply a UE-to-UE coexistence requirement.

If the first carrier corresponds to 3GPP standard based E-UTRA band 1 and if the second carrier corresponds to 3GPP standard based E-UTRA band 5, then a maximum level of spurious emission is −27 dBm for protecting other UE using a 3GPP standard based E-UTRA band 26 in order to apply a UE-to-UE coexistence requirement.

According to a disclosure of the present specification, an adjacent band can be protected when using inter-band carrier aggregation (CA).

BRIEF DESCRIPTION OF THE DRAWINGS

FIG. 15a to FIG. 15c exemplify test methods for Case B, i.e., 2*Min(CBW_X, CBW_Y)≤Band Gap<2*(CBW_X+CBW_Y).

FIG. 16a and FIG. 16b exemplify test methods for Case C, i.e., Band Gap<2*Min(CBW_X, CBW_Y).

DESCRIPTION OF EXEMPLARY EMBODIMENTS

Figure 1:
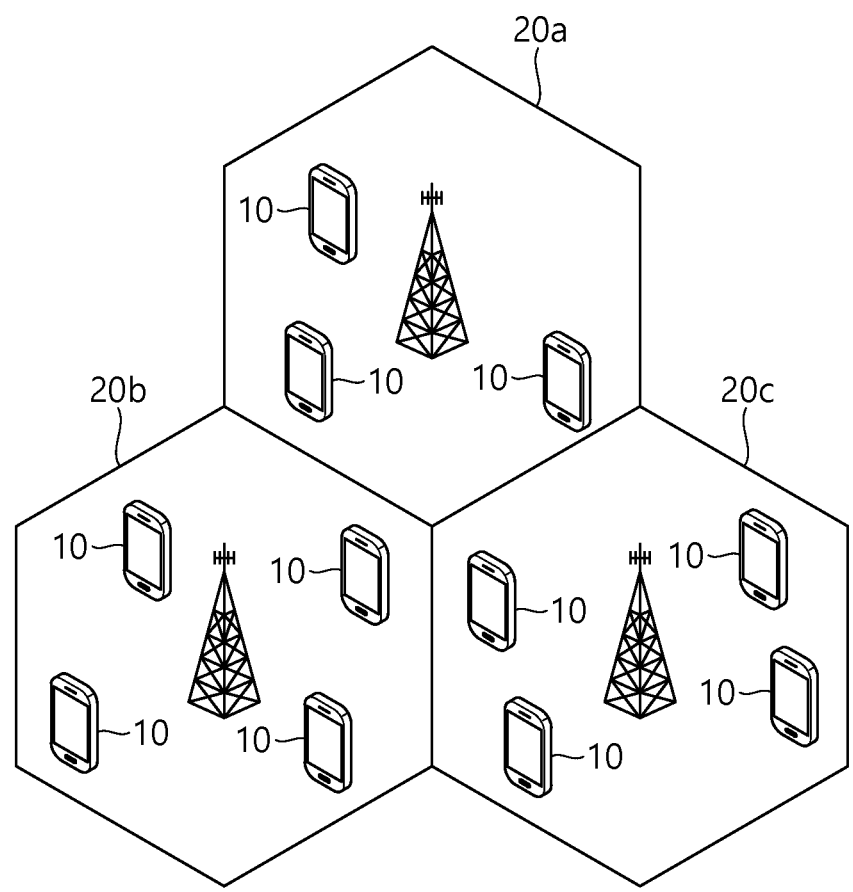
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

Meanwhile, the LTE system is described in further detail.

Figure 2:
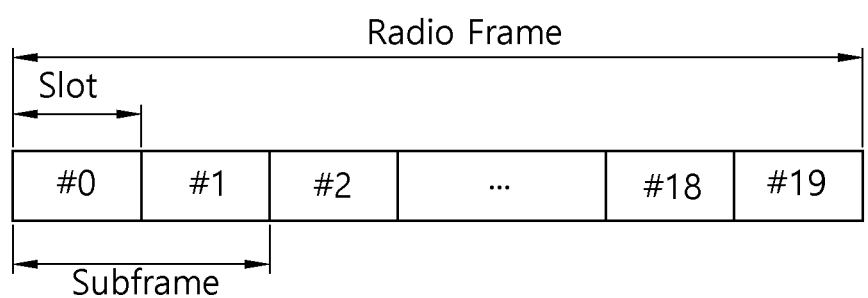
FIG. 2 illustrates the architecture of a radio frame according to frequency division duplex (FDD) in $3^{rd}$ generation partnership project (3GPP) long term evolution (LTE).

FIG. 2 illustrates the architecture of a radio frame according to FDD in 3GPP LTE.

Referring to FIG. 2, the radio frame consists of 10 sub-frames, and each sub-frame includes two slots. The slots in the radio frame are numbered with slot numbers 0 to 19. The time taken for one sub-frame to be transmitted is denoted TTI (transmission time interval). The TTI may be a scheduling unit for data transmission. For example, the length of one radio frame is 10 ms, the length of one sub-frame is 1 ms, and the length of one slot may be 0.5 ms.

The architecture of radio frame is merely an example, and the number of sub-frames in the radio frame or the number of slots in each sub-frame may be changed variously.

In TDD, a DL (downlink) sub-frame and a UL (Uplink) co-exist in one radio frame. Table 1 shows an example of configuration of a radio frame.

TABLE 1

| UL-DL Configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

Figure 3:
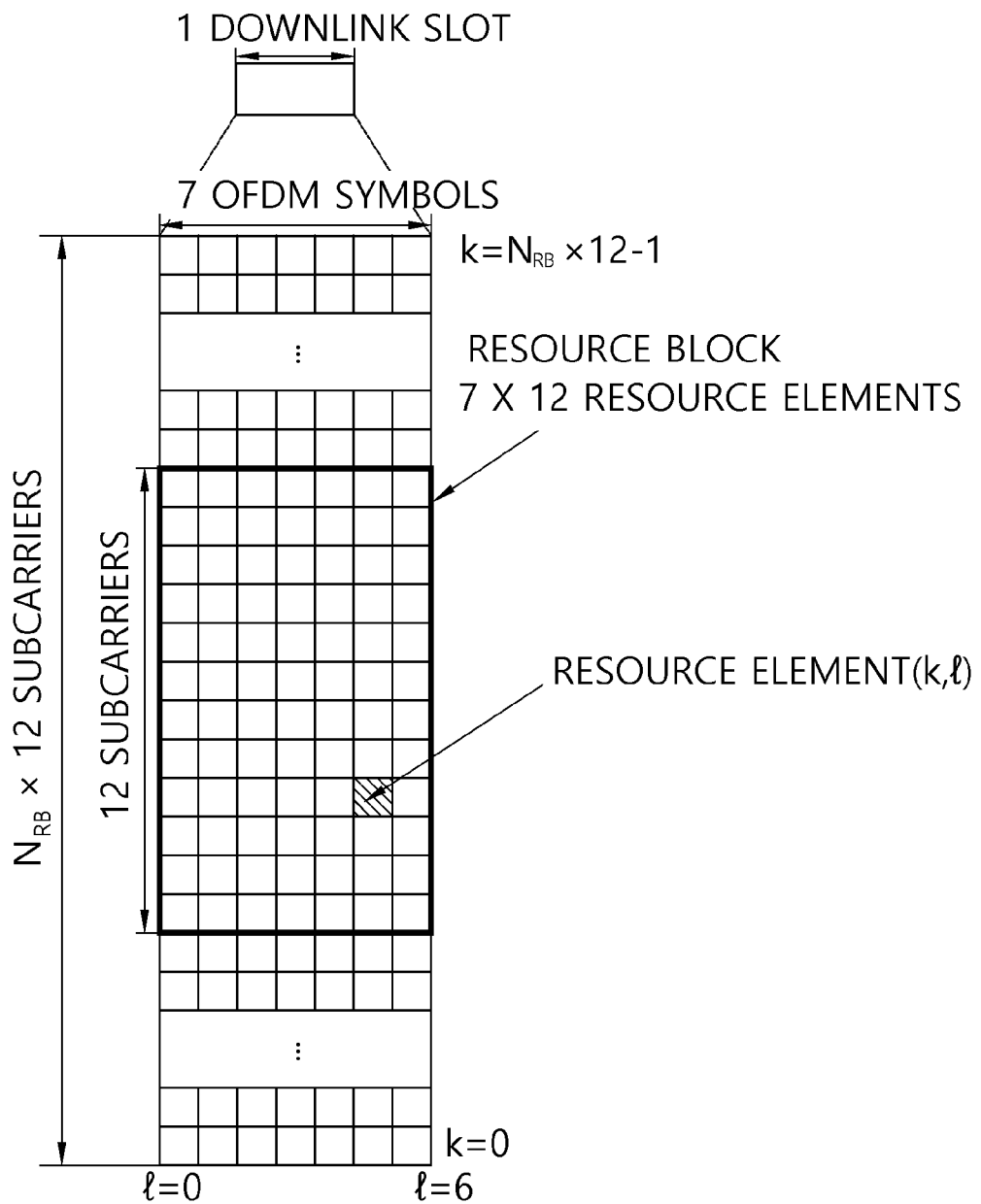
FIG. 3 illustrates an example resource grid for one uplink or downlink slot in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., $N_{RB}$, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 3 may also apply to the resource grid for the downlink slot.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

A carrier aggregation system is now described.

Figure 4:
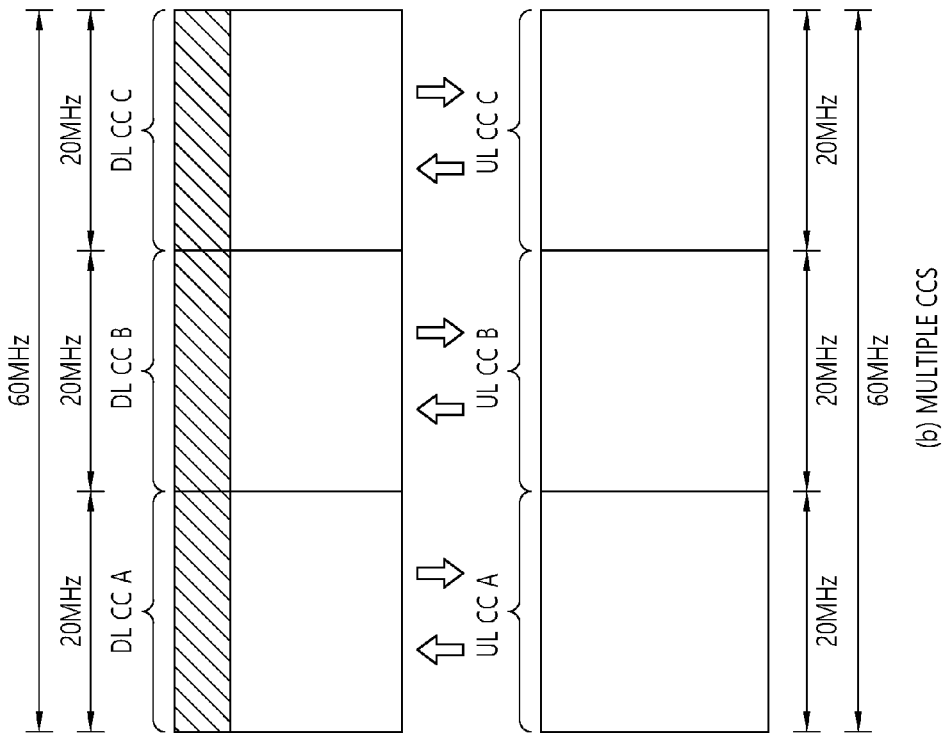
FIG. 4 illustrates an example of comparison between a single carrier system and a carrier aggregation system.
Figure 4:
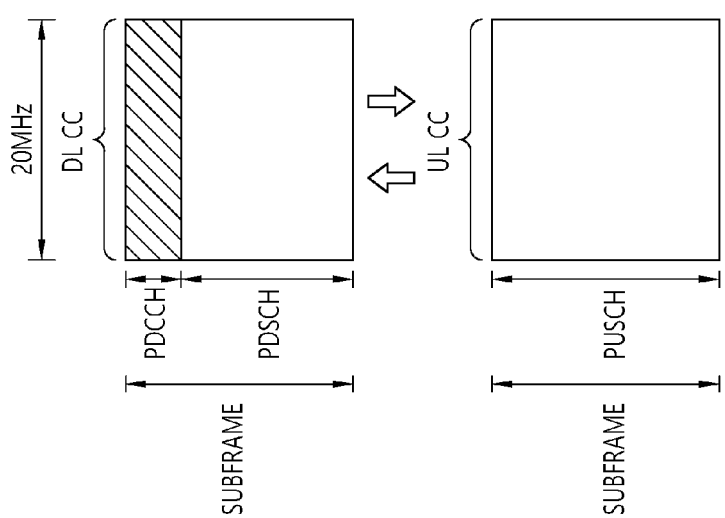

FIG. 4 illustrates an example of comparison between a single carrier system and a carrier aggregation system.

Referring to FIG. 4, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

A frequency band of a wireless communication system is divided into a plurality of carrier frequencies. Herein, the carrier frequency implies a center frequency of a cell.

Accordingly, carrier aggregation (CA) may be regarded as aggregation of a plurality of cells. Therefore, according to the CA, a cell may be divided into a primary cell, a secondary cell, and a serving cell. The primary cell implies a cell which operates at a primary frequency, and the secondary cell implies a cell which operates at a secondary frequency. The serving cell implies only the primary cell when the carrier aggregation is not configured or when the UE cannot provide the carrier aggregation. However, if the carrier aggregation is configured, the term 'serving cell' implies a plurality of cells configured to the UE.

Meanwhile, the carrier aggregation (CA) technologies, as described above, may be generally separated into an inter-band CA technology and an intra-band CA technology. The inter-band CA is a method that aggregates and uses CCs that are present in different bands from each other, and the intra-band CA is a method that aggregates and uses CCs in the same frequency band. Further, CA technologies are more specifically split into intra-band contiguous CA, intra-band non-contiguous CA, and inter-band non-contiguous CA.

Figure 5:
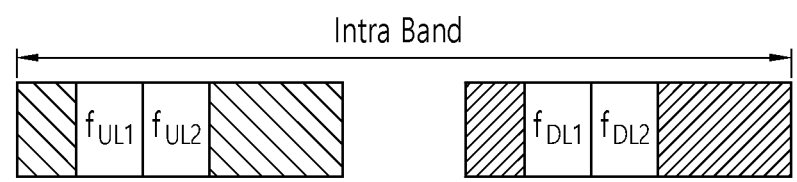
FIG. 5 is a concept view illustrating intra-band carrier aggregation (CA).
Figure 5:
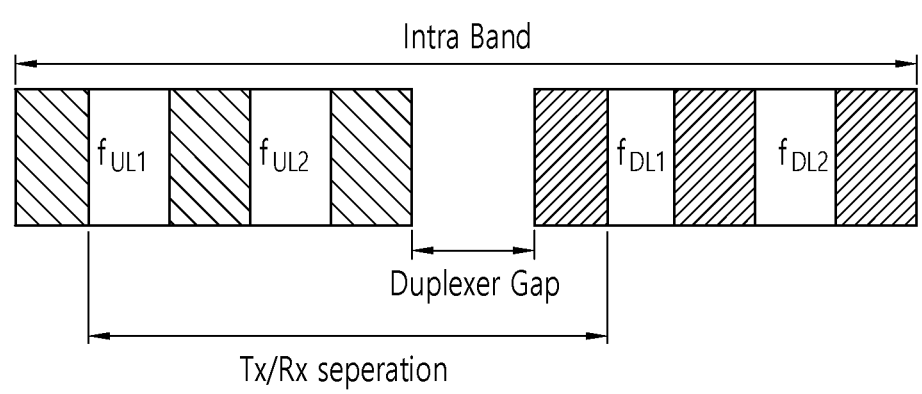

FIG. 5 is a concept view illustrating intra-band carrier aggregation (ca).

FIG. 5(a) illustrates intra-band contiguous CA, and FIG. 5(b) illustrates intra-band non-contiguous CA.

LTE-advanced adds various schemes including uplink MIMO and carrier aggregation in order to realize high-speed wireless transmission. The CA that is being discussed in LTE-advanced may be split into the intra-band contiguous CA shown in FIG. 5(a) and the intra-band non-contiguous CA shown in FIG. 5(b).

Figure 6:
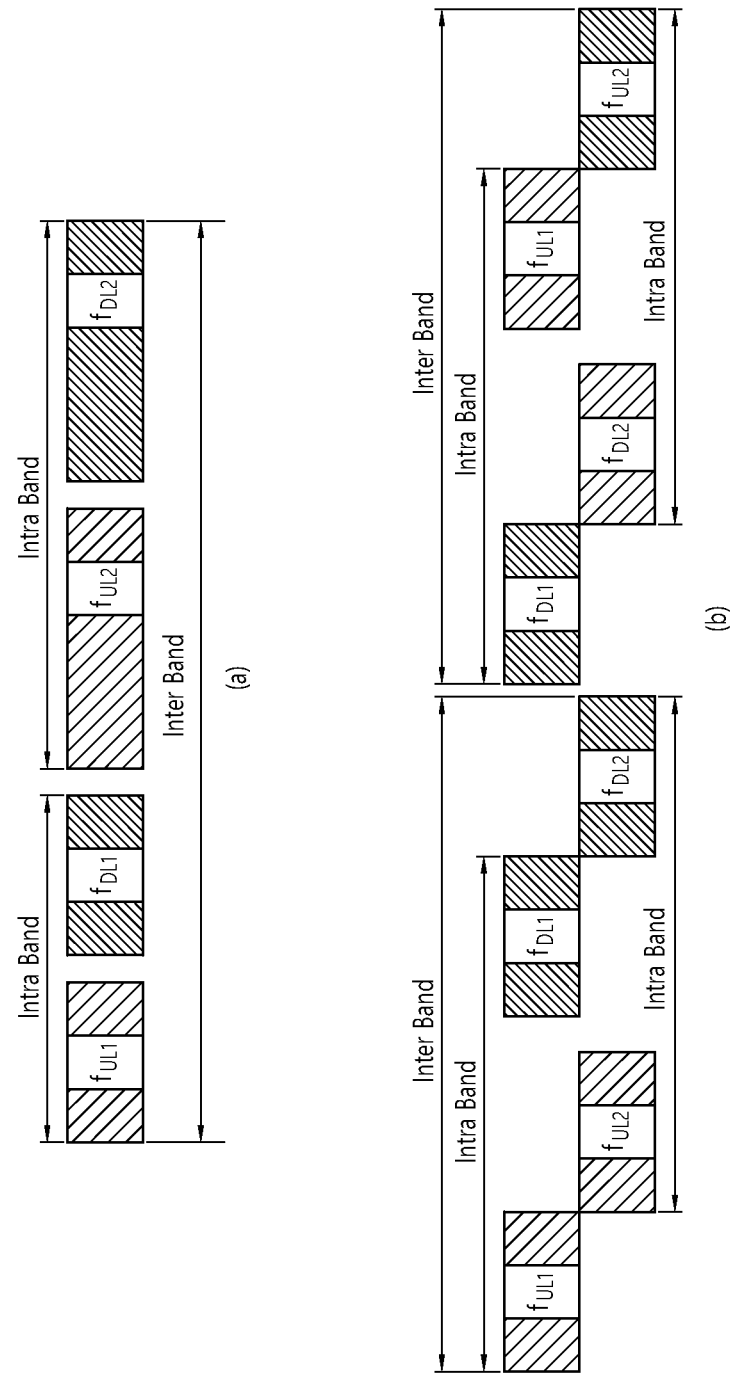
FIG. 6 is a concept view illustrating inter-band carrier aggregation.

FIG. 6 is a concept view illustrating inter-band carrier aggregation.

FIG. 6(a) illustrates a combination of a lower band and a higher band for inter-band CA, and FIG. 6(b) illustrates a combination of similar frequency bands for inter-band CA.

In other words, the inter-band carrier aggregation may be separated into inter-band CA between carriers of a low band and a high band having different RF characteristics of inter-band CA as shown in FIG. 6(a) and inter-band CA of similar frequencies that may use a common RF terminal per component carrier due to similar RF (radio frequency) characteristics as shown in FIG. 6(b).

TABLE 2

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |

TABLE 2-continued

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A N/A | 1452 MHz-1496 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

Meanwhile, the 3GPP LTE/LTE-A systems define operating bands for uplink and downlink as shown in Table 2 above. Four CA cases shown in FIG. 11 come from Table 2.

Here, $F_{UL\_low}$ means the lowest frequency in the uplink operating bands. $F_{UL\_high}$ means the highest frequency in the uplink operating bands. Further, $F_{DL\_low}$ means the lowest frequency in the downlink operating bands, and $F_{DL\_high}$ means the highest frequency in the downlink operating bands.

When the operating bands are defined as shown in Table 2, each nation's frequency distributing organization may assign specific frequencies to service providers in compliance with the nation's circumstances.

Meanwhile, intra-band contiguous CA bandwidth classes and their corresponding guard bands are as shown in the following table.

TABLE 3

| CA Bandwidth Class | Aggregated Transmission Bandwidth Configuration | Maximum number of CCs | Nominal Guard Band BWGB |
|---|---|---|---|
| A | $N_{RB,agg} \leq 100$ | 1 | a1$BW_{Channel(1)}$ − 0.5Δf1 (NOTE2) |
| B | $N_{RB,agg} \leq 100$ | 2 | 0.05 max($BW_{Channel(1)}$, $BW_{Channel(2)}$) − 0.5Δf1 |
| C | $100 < N_{RB,agg} \leq 200$ | 2 | 0.05 max($BW_{Channel(1)}$, $BW_{Channel(2)}$) − 0.5Δf1 |
| D | $200 < N_{RB,agg} \leq [300]$ | FFS | 0.05 max($BW_{Channel(1)}$, $BW_{Channel(2)}$) − 0.5Δf1 |
| E | $[300] < N_{RB,agg} \leq [400]$ | FFS | FFS |
| F | $[400] < N_{RB,agg} \leq [500]$ | FFS | FFS |

NOTE1:
$BW_{Channel(i)}$, i = 1, 2, 3 is the channel bandwidth of the E-UTRA component carriers defined in TS36.101 table 5.6-1, Δf1 represents subcarrier spacing of Δf when downlink, and Δf1 = 0 in downlink.
NOTE2:
In case that the channel frequency bandwidth is 1.4 MHz, a1 = 0.16/1.4, and in the remainder frequency band, a1 = 0.05.

In the above table, the brackets [ ] represent that the value therebetween is not completely determined and may be varied. FFS stands for 'For Further Study.' $N_{RB\_agg}$ is the number of RBs aggregated in an aggregation channel band.

Table 4 below shows bandwidth sets respective corresponding to intra-band contiguous CA configurations.

TABLE 4

E-UTRA CA configuration/Bandwidth combination set

| E-UTRA CA configuration | Channel frequency bandwidth permitted by each carrier | Channel frequency bandwidth permitted by each carrier | Channel frequency bandwidth permitted by each carrier | Maximum aggregated bandwidth [MHz] | Bandwidth Combination Set |
|---|---|---|---|---|---|
| CA_1C | 15 20 | 15 20 | | 40 | 0 |
| CA_3C | 5, 10, 15 20 | 20 5, 10, 15, 20 | | 40 | 0 |
| CA_7C | 15 20 10 15 20 | 15 20 20 15, 20 10, 15, 20 | | 40 40 | 0 1 |
| CA_23B | 10 5 | 10 15 | | 20 | 0 |
| CA_27B | 1.4, 3, 5 1.4, 3 | 5 10 | | 13 | 0 |
| CA_38C | 15 20 | 15 20 | | 40 | 0 |
| CA_39C | 5, 10, 15 20 | 20 5, 10, 15 | | 35 | 0 |
| CA_40C | 10 15 20 | 20 15 10, 20 | | 40 | 0 |
| CA_41C | 10 15 20 5, 10 15 20 | 20 15, 20 10, 15, 20 20 15, 20 5, 10, 15, 20 | | 40 40 | 0 1 |
| CA_40D | 10,20 20 20 | 20 10 20 | 20 20 10 | 60 | 0 |
| CA_41D | 10 10 15 15 20 20 | 20 15, 20 20 10, 15, 20 15, 20 10, 15, 20 | 15 20 10, 15 20 10 15, 20 | 60 | 0 |
| CA_42C | 5, 10, 15, 20 20 | 20 20 5, 10, 15 | 5, 10, 15, 20 20 | 40 | 0 |

In the above table, CA configuration represents an operating bandwidth and CA bandwidth class. For example, CA_1C means operating band 2 in Table 2 and CA band class C in Table 3. All of the CA operating classes may apply to bands that are not shown in the above table. In addition, class D is added in Rel-12 as represented in the above table, through this, maximum 3 carriers can be transmitted from the intra-band continuous CA at the same time.

Figure 7:
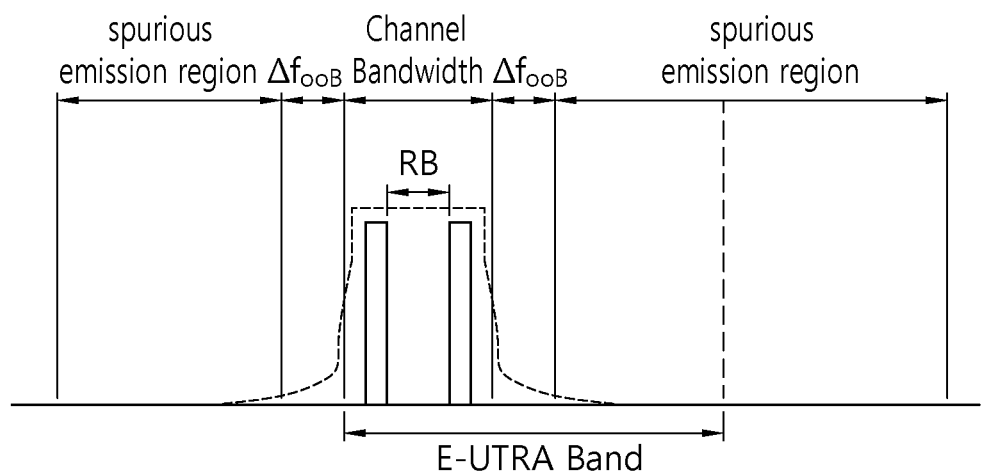
FIG. 7 illustrates the concept of unwanted emission, FIG. 8 specifically illustrates out-of-band emission of the unwanted emission shown in FIG. 7.
Figure 8:
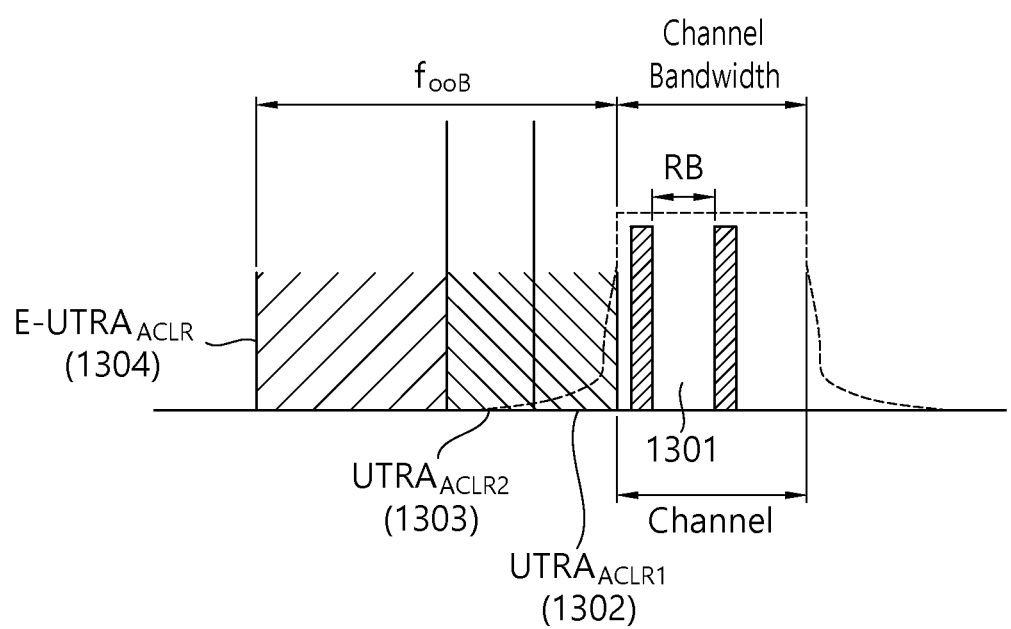
Figure 9:
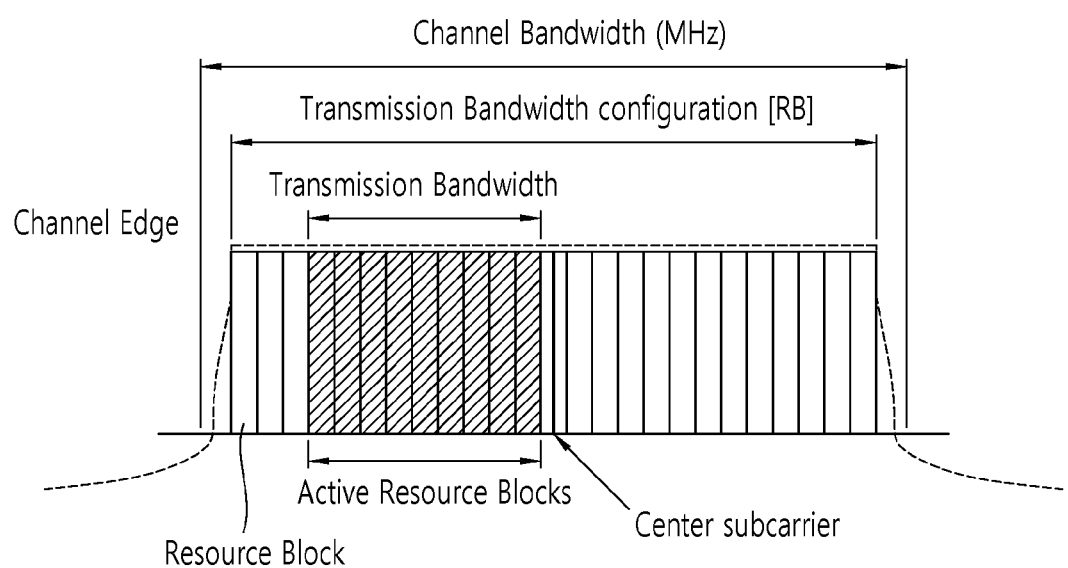
FIG. 9 illustrates a relationship between the resource block resource block (RB) and channel band (MHz) shown in FIG. 7.

FIG. 7 illustrates the concept of unwanted emission. FIG. 8 specifically illustrates out-of-band emission of the unwanted emission shown in FIG. 7. FIG. 9 illustrates a relationship between the resource block RB and channel band (MHz) shown in FIG. 7.

As can be seen from FIG. 7, a transmission modem sends a signal over a channel bandwidth assigned in an E-UTRA band.

Here, the channel bandwidth is defined as can be seen from FIG. 9. That is, a transmission bandwidth is set to be smaller than the channel bandwidth ($BW_{Channel}$). The transmission bandwidth is set by a plurality of resource blocks (RBs). The outer edges of the channel are the highest and lowest frequencies that are separated by the channel bandwidth.

Meanwhile, as described above, the 3GPP LTE system supports channel bandwidths of 1.4 MHz, 3 MHz, 5 MHz, 10 MHz, 15 MHz, and 20 MHz. The relationship between such channel bandwidths and the number of resource blocks is as below.

TABLE 5

| | Channel bandwidth BW$_{Channel}$ [MHz] | | | | |
|---|---|---|---|---|---|
| | 1.4 | 3 | 5 | 10 | 15 | 20 |
| Transmission bandwidth settings NRB | 6 | 15 | 25 | 50 | 75 | 100 |

Turning back to FIG. 7, unwanted emission arises in the band of $\Delta f_{OOB}$, and as shown, unwanted emission also occurs on the spurious area. Here, $\Delta f_{OOB}$ means the magnitude in the out-of-band (OOB). Meanwhile, the out-of-band omission refers to the one that arises in a band close to an intended transmission band. The spurious emission means that unwanted waves spread up to a frequency band that is far away from the intended transmission band.

Meanwhile, 3GPP release 10 defines basic SE (spurious emission) that should not be exceeded according to a frequency range.

TABLE 6

| Frequency band | Maximum level | Measurement band |
|---|---|---|
| 9 kHz ≤ f < 150 kHz | −36 dBm | 1 kHz |
| 150 kHz ≤ f < 30 MHz | −36 dBm | 10 kHz |
| 30 MHz ≤ f < 1000 MHz | −36 dBm | 100 kHz |
| 1 GHz ≤ f < 12.75 GHz | −30 dBm | 1 MHz |

Meanwhile, when it is separated by a specific frequency distance from an outer edge of a given channel band, a basic spectrum emission mask (SEM) which is lower limit that should not be exceeded is summarized by the following table.

TABLE 7

| | Spectrum Emission Limit for channel band (dBm) | | | | | | |
|---|---|---|---|---|---|---|---|
| $\Delta f_{OOB}$ (MHz) | 1.4 MHz | 3.0 MHz | 5 MHz | 10 MHz | 15 MHz | 20 MHz | Measurement band |
| ±0-1 | −10 | −13 | −15 | −18 | −20 | −21 | 30 kHz |
| ±1-2.5 | −10 | −10 | −10 | −10 | −10 | −10 | 1 MHz |
| ±2.5-2.8 | −25 | −10 | −10 | −10 | −10 | −10 | 1 MHz |
| ±2.8-5 | | −10 | −10 | −10 | −10 | −10 | 1 MHz |
| ±5-6 | | −25 | −13 | −13 | −13 | −13 | 1 MHz |
| ±6-10 | | −25 | −13 | −13 | −13 | −13 | 1 MHz |
| ±10-15 | | | | −25 | −13 | −13 | 1 MHz |
| ±15-20 | | | | | −25 | −13 | 1 MHz |
| ±20-25 | | | | | | −25 | 1 MHz |

Herein, $\Delta f_{OOB}$ stands for 'Frequency of Out Of Band emission', and denotes a frequency thereof when emitted to an out-of-band. Further, dBm is a unit indicating power (Watt), and 1 mW=0 dBm.

Meanwhile, as shown in FIG. 8, when transmission is performed in an E-UTRA channel band 1301, leakage occurs to out-of-bands (see 1302, 1303, and 1304 in the illustrated regions of $f_{OOB}$), that is, unwanted emission occurs.

An adjacent channel leakage ratio (ACLR) is an average power ratio of an adjacent channel against average power of an allocated channel. Herein, if the adjacent channel 1302 is for UTRAN when a terminal performs transmission in the E-UTRAN channel 1301, the illustrated UTRA$_{ACLR1}$ is an adjacent channel leakage ratio, that is, a leakage ratio with respect to the adjacent channel 1302, i.e., a UTRAN channel. Further, as shown in FIG. 8, if the channel 1303 located next to the adjacent channel 1302 is for UTRAN, the UTRA$_{ACLR2}$ is an adjacent channel leakage ratio, that is, a leakage ratio with respect to the adjacent channel 1303, i.e., a UTRA channel. Furthermore, as shown in FIG. 8, when the terminal performs transmission in the E-UTRA channel 1301, the E-UTRA$_{ACLR}$ is an adjacent channel leakage ratio, that is, a leakage ratio with respect to the adjacent channel 1304, i.e., an E-UTRA channel.

A requirement of E-UTRA$_{ACLR}$ is defined in the following table.

TABLE 8

| | Channel band/E-UTRA$_{ACLR1}$/Measurement band | | | | | |
|---|---|---|---|---|---|---|
| | 1.4 MHz | 3.0 MHz | 5 MHz | 10 MHz | 15 MHz | 20 MHz |
| E-UTRA$_{ACLR1}$ | 30 dB | 30 dB | 30 dB | 30 dB | 30 dB | 30 dB |
| E-UTRA channel measurement band | 1.08 MHz | 2.7 MHz | 4.5 MHz | 9.0 MHz | 13.5 MHz | 18 MHz |
| adjacent channel's central frequency offset [MHz] | +1.4/−1.4 | +3.0/−3.0 | +5/−5 | +10/−10 | +15/−15 | +20/−20 |

A requirement of UTRA$_{ACLR1/2}$ is defined in the following table.

TABLE 9

| | Channel bandwidth/UTRA$_{ACLR1/2}$/Measurement band | | | | | |
|---|---|---|---|---|---|---|
| | 1.4 MHz | 3.0 MHz | 5 MHz | 10 MHz | 15 MHz | 20 MHz |
| UTRA$_{ACLR1}$ adjacent channel's central frequency offset [MHz] | 33 dB<br>0.7 + BW$_{UTRA}$/2−0.7 − BW$_{UTRA}$/2 | 33 dB<br>1.5 + BW$_{UTRA}$/2−1.5 − BW$_{UTRA}$/2 | 33 dB<br>+2.5 + BW$_{UTRA}$/2−2.5 − BW$_{UTRA}$/2 | 33 dB<br>+5 + BW$_{UTRA}$/2−5 − BW$_{UTRA}$/2 | 33 dB<br>+7.5 + BW$_{UTRA}$/2−7.5 − BW$_{UTRA}$/2 | 33 dB<br>+10 + BW$_{UTRA}$/2−10 − BW$_{UTRA}$/2 |

TABLE 9-continued

| | Channel bandwidth/UTRA$_{ACLR1/2}$/Measurement band | | | | | |
|---|---|---|---|---|---|---|
| | 1.4 MHz | 3.0 MHz | 5 MHz | 10 MHz | 15 MHz | 20 MHz |
| UTRA$_{ACLR2}$ adjacent channel's central frequency offset [MHz] | — | — | 36 dB +2.5 + 3*BW$_{UTRA}$/2/−2.5 − 3*BW$_{UTRA}$/2 | 36 dB +5 + 3*BW$_{UTRA}$/2/−5 − 3*BW$_{UTRA}$/2 | 36 dB +7.5 + 3*BW$_{UTRA}$/2/−7.5 − 3*BW$_{UTRA}$/2 | 36 dB +10 + 3*BW$_{UTRA}$/2/−10 − 3*BW$_{UTRA}$/2 |
| E-UTRA channel measurement band | 1.08 MHz | 2.7 MHz | 4.5 MHz | 9.0 MHz | 13.5 MHz | 18 MHz |
| UTRA 5 MHz channel measurement band (Note 1) | 3.84 MHz | 3.84 MHz | 3.84 MHz | 3.84 MHz | 3.84 MHz | 3.84 MHz |
| UTRA 1.6 MHz channel measurement band (Note 2) | 1.28 MHz | 1.28 MHz | 1.28 MHz | 1.28 MHz | 1.28 MHz | 1.28 MHz |

In the above table, BW$_{UTRA}$ denotes a channel bandwidth for UTRA.

As described above, unwanted emission occurs in adjacent channels when transmission is performed in an allocated channel band.

As described above, unwanted emission occurs in adjacent bands due to wireless transmission. In this case, regarding interference caused by emission depending on transmission of a BS, an amount of interference which enters an adjacent band due to a design of a high cost and large-sized RF filter or the like according to a characteristic of the BS may be decreased to be less than or equal to a permitted reference. On the other hand, in case of the terminal, it is difficult to completely prevent the interference from entering the adjacent band due to a restriction of a terminal size, a cost restriction on a pre-duplex filter RF element or the like.

Therefore, there is a need to restrict transmission power of the terminal.

Maximum power Pcmax that can be used in practice by the terminal in the LTE system can be simply expressed as follows.

$$Pcmax = Min(Pemax, Pumax)$$ [Equation 1]

Herein, Pcmax denotes maximum power (actual maximum transmission power) that can be transmitted by the terminal in a corresponding cell, and Pemax denotes maximum power that can be used in a corresponding cell signaled by the BS. Further, Pumax denotes power considering a maximum power reduction (MPR), an additive-MPR (hereinafter, A-MPR) or the like for maximum power P$_{PowerClass}$ of the terminal itself.

The maximum power P$_{PowerClass}$ of as the UE itself is shown in the following table.

TABLE 10

| Operating band | Power class 1 (dBm) | Power class 3 (dBm) |
|---|---|---|
| 1, 2, 3, 4, 5, 6, 7, 8, 9, 10, 11, 12, 13, 14, 17, 18, 19, 20, 21, 22, 23, 24, 25, 26, 27, 28, 30, 31, 33, 34, 35, 36, 37, 38, 39, 40, 41, 42, 43, 44 | | 23 dBm |
| 14 | 31 dBm | |

Meanwhile, in case of intra band-contiguous CA, the maximum power P$_{PowerClass}$ of the terminal itself is as shown in the following table.

TABLE 11

| Operating band | Power class 3 (dBm) |
|---|---|
| CA_1C | 23 dBm |
| CA_3C | 23 dBm |
| CA_7C | 23 dBm |
| CA_38C | 23 dBm |
| CA_39C | 23 dBm |
| CA_40C | 23 dBm |
| CA_41C | 23 dBm |
| CA_42C | 23 dBm |

Figure 10:
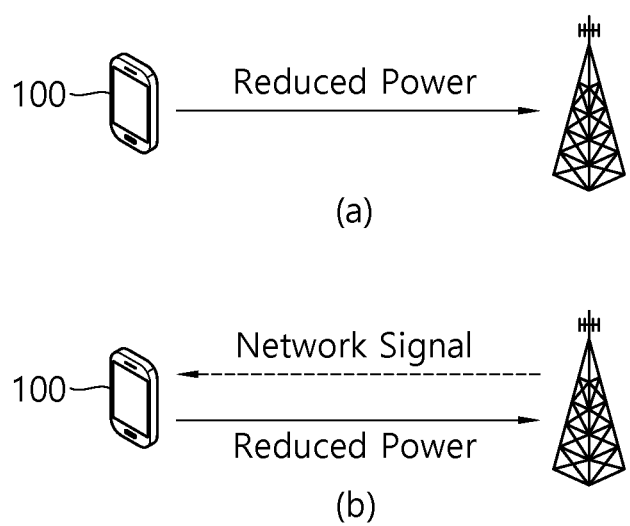
FIG. 10 illustrates an example of a method of restricting transmission power of a terminal.

FIG. 10 illustrates an example of a method of restricting transmission power of a terminal.

As can be seen from FIG. 10(a), a terminal 100 performs transmission by restricting transmission power.

Regarding a maximum power reduction (MPR) value for restricting the transmission power, when a peak-to-average power ratio (PAPR) is great, linearity of a power amplifier (PA) for this is decreased. In order to maintain the linearity, an MPR value of up to 2 dB may be applied according to a modulation scheme.

<MPR Based on 3GPP Release 11>

Meanwhile, according to 3GPP release 11, a terminal can simultaneously transmit a PUSCH and a PUCCH since multi-clustered transmission is adopted in a single component carrier (CC). As such, when the PUSCH and the PUCCH are transmitted simultaneously, a magnitude of an IM3 component generated in an out-of-band region (this means a distortion signal generated due to inter-modulation) may be more increased than the conventional case, which may act as greater interference in an adjacent band. Therefore, the terminal may set an MPR value to satisfy general spurious emission (SE), adjacent channel leakage ratio (ACLR), and general spectrum emission mask (SEM) as emission requirements for the terminal and to be transmitted in an uplink.

<A-MPR>

As can be seen from FIG. 10 (b), a BS may apply additional maximum power reduction (A-MPR) by transmitting a network signal (NS) to a terminal 100. The A-MPR is used not to have an effect such as interference or the like on an adjacent band unlike in the aforementioned MPR in such a manner that the BS transmits the NS to the terminal 100 operating in a specific band and the terminal 100 additionally performs power reduction. That is, when the terminal to which the MPR is applied receives the NS, transmission power is determined by additionally applying the A-MPR.

The following table shows a value of A-MPR based on a network signal.

TABLE 12

| Network signalling value | Channel bandwidth (MHz) | Resources Blocks (NRB) | A-MPR (dB) |
|---|---|---|---|
| NS_01 | 1.4, 3, 5, 10, 15, 20 | | reserved |
| NS_03 | 3 | >5 | ≤1 |
| | 5 | >6 | ≤1 |
| | 10 | >6 | ≤1 |
| | 15 | >8 | ≤1 |
| | 20 | >10 | ≤1 |
| NS_04 | 5 | >6 | ≤1 |
| NS_05 | 10, 15, 20 | ≥50 | ≤1 |
| NS_06 | 1.4, 3, 5, 10 | — | reserved |
| NS_07 | 10 | shown in Table 9 | |
| NS_08 | 10, 15 | >44 | ≤3 |
| NS_09 | 10, 15 | >40 | ≤1 |
| | | >55 | ≤2 |
| NS_18 | 5 | ≥2 | ≤1 |
| | 10, 15, 20 | ≥1 | ≤4 |

The following table shows an A-MPR value when a network signal is NS_07.

TABLE 13

| Parameter | Region A | | Region B | | Region C |
|---|---|---|---|---|---|
| $RB_{start}$ | 0-12 | | 13-18 | 19-42 | 43-49 |
| $L_{CRB}$ [RBs] | 6-8 | 1-5, 9-50 | ≥8 | ≥18 | ≤2 |
| A-MPR [dB] | ≤8 | ≤12 | ≤12 | ≤6 | ≤3 |

In the above table, $RB_{start}$ denotes a lowest RB index of transmission RB. Further, $L_{CRB}$ denotes a length of consecutive RB allocation.

For example, if NS_07 is received as a network signal by a terminal which receives a service by using a 10 MHz channel bandwidth in a band 13, the terminal performs transmission by determining transmission power according to the above table. That is, when the terminal decodes a received uplink grant, if an RB start position instructs to continuously send 5 RBs in a $10^{th}$ RB, the terminal may perform transmission by applying up to 12 dB to the A-MPR value.

<A-MPR Based on CA>

On the other hand, an uplink channel bandwidth may be increased to up to 40 MHz (20 MHz+20 MHz) when CA is considered. Therefore, if a BS transmits a network signal to a terminal in order to protect a specific band in a CA environment, an adjacent band can be protected by performing additional power reduction on the terminal operating in the specific band.

DISCLOSURE OF THE PRESENT SPECIFICATION

Figure 11A:
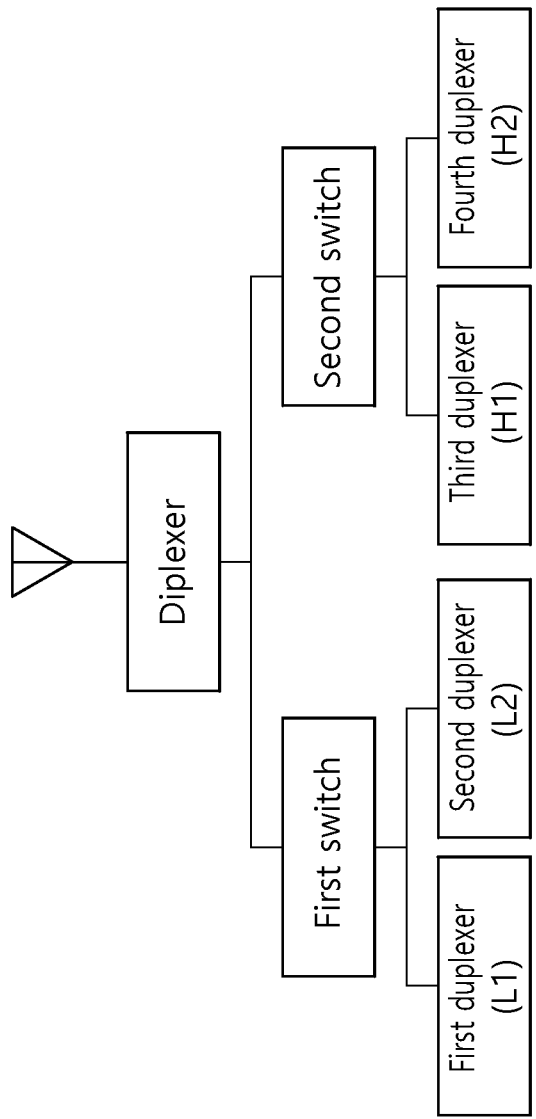
FIG. 11a and FIG. 11b illustrate a radio frequency (RF) chain structure of a terminal for inter-band carrier aggregation.
Figure 11B:
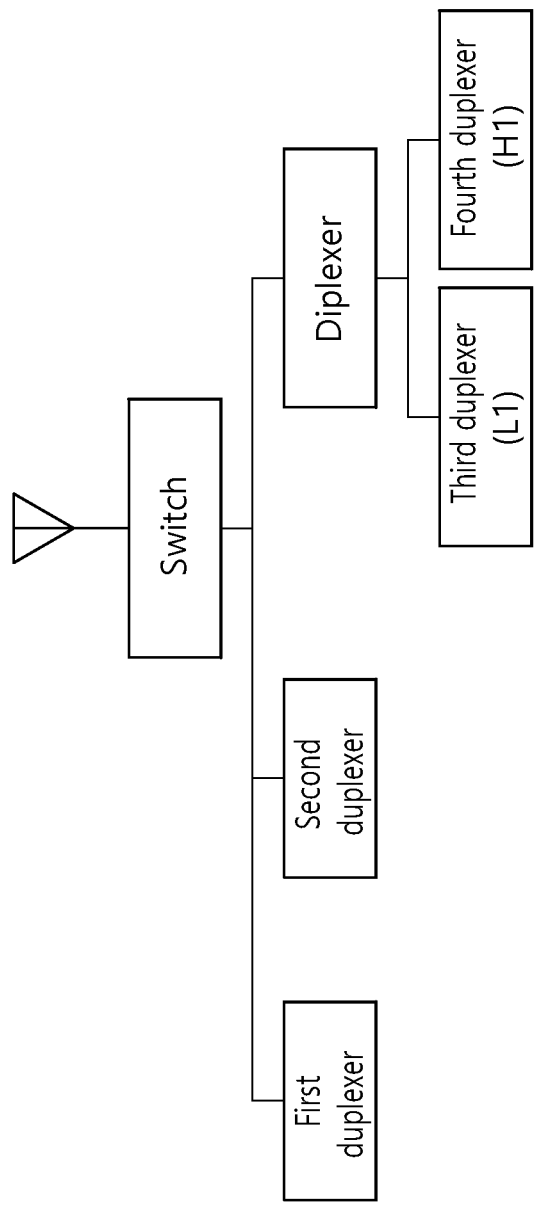

FIG. 11a and FIG. 11b illustrate an RF chain structure of a terminal for inter-band carrier aggregation.

Referring to FIG. 11a, an antenna is connected to a diplexer. In case of transmission, the diplexer is connected to the antenna by combining a low band and a high band. In case of reception, the diplexer separates the low band and the high band from a signal received from the antenna and thereafter outputs them respectively to a first switch and a second switch. The first switch selectively connects a first duplexer for a first low band L1 and a second duplexer for a second low band L2 to the diplexer. Likewise, the second switch selectively connects a third duplexer for a first high band H1 and a fourth duplexer for a second high band H2 to the diplexer. Each duplexer separates transmission and reception.

Meanwhile, referring to FIG. 11b, the antenna is connected to the switch. The switch is connected to one or more duplexers (e.g., the first duplexer and the second duplexer) and is connected to the diplexer. The diplexer is connected to the third duplexer and the fourth duplexer. For example, the third duplexer may separate transmission and reception of, for example, the first low band L1, and may separate transmission and reception of, for example, the first high band H1. The first duplexer may separate transmission and reception of, for example, a first mid band, and the second duplexer may separate transmission and reception of, for example, a second mid band.

Meanwhile, out-of-band emission caused by inter-band carrier aggregation will be described hereinafter. The out-of-band emission implies unwanted emission which leaks to outside a channel bandwidth due to non-linearity and a modulation process in a transmitter. Herein, the out-of-band emission refers to unwanted emission other than spurious emission (SE). An effort of an adjacent terminal or BS for decreasing an effect caused by such emission by effectively suppressing the out-of-band emission may be defined from a perspective of spectrum emission mask (SEM) and adjacent channel leakage ratio (ACLR) of the terminal.

Accordingly, a requirement for the SE, the SEM, the ACLR, etc., will be described hereinafter according to an inter-band carrier aggregation situation.

I. Requirement for Spurious Emission (SE)

Figure 12:
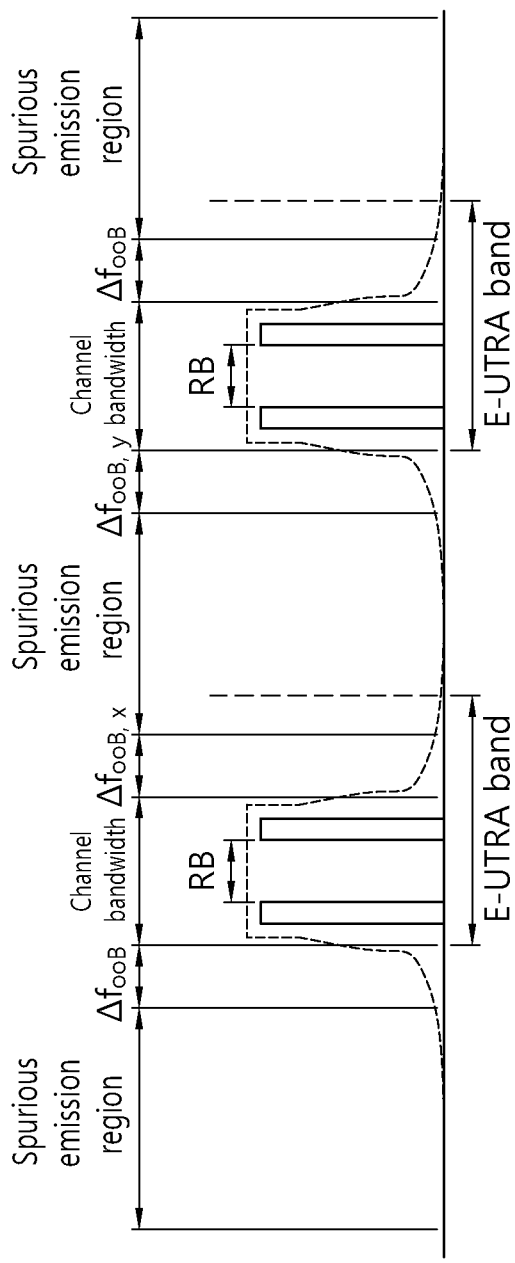
FIG. 12 illustrates an example of spurious emission (SE) according to inter-band carrier aggregation.

FIG. 12 illustrates an example of SE according to inter-band carrier aggregation.

As can be seen from FIG. 12, in the inter-band carrier aggregation, a spurious emission region based on transmission of a terminal on two bands may not include an out-of-band (OOB) emission frequency range and a channel frequency range in an individual carrier. Therefore, the existing requirement for the spurious emission (SE) may be applied to the individual carrier. That is, the requirement of the basic SE of Table 6 may also be applied to the inter-band carrier aggregation.

Meanwhile, a combination of bands used for inter-band carrier aggregation (CA) is shown in the following table.

TABLE 14

| | Band combination | Frequency | Band gap |
|---|---|---|---|
| A1 | B1 + 5 | 2.1 G + 800M | 1071 MHz |
| | B1 + B19 | 2.1 G + 800M | 1075 MHz |
| | B3 + 20 | 1.8 G + 800M | 848 MHz |
| A2 | B3 + 8 | 1.8 G + 900M | 795 MHz |
| | B4 + 12 | 2.1 G + 700M | 994 MHz |
| | B4 + 17 | 2.1 G + 700M | 994 MHz |
| A3 | B1 + 7 | 2.1 G + 2.6 G | 520 MHz |
| | B3 + B7 | 1.7 G + 2.6 G | 715 MHz |
| | B4 + B7 | 1.7 G + 2.6 G | 745 MHz |
| | B5 + B12 | 2 ULs (824~849M) + (698~716M) | 108 MHz |
| | B5 + B17 | 2 ULs (824~849M) + (704~716M) | 108 MHz |

TABLE 14-continued

|    | Band combination | Frequency   | Band gap |
|----|------------------|-------------|----------|
| A4 | B3 + 5           | 1.8 G + 800M| 861 MHz  |
|    | B2 + B4          | 1.9 G + 2.1 G| 95 MHz  |
|    | B7 + B20         | 2.6 G + 800M| 1638 MHz |
|    | B3 + B26         | 1.8 G + 800M| 861 MHz  |
| A5 | B1 + B21         | 2.1 G + 1.4 G| 457 MHz |
|    | B19 + B21        | 800M + 1.4 G| 603 MHz  |

In Table 4 above, the class implies the CA bandwidth class of Table 3. In addition, in the above table, a band combination implies the band of Table 2.

As can be seen from Table 14 above, a minimum band gap between two carriers is 95 MHz of a combination of B2 and B4. Eventually, all combinations shown in the above table correspond to a case where a band gap between two carrier bands is related as: Band Gap>$\Delta f_{OOB,X}+\Delta f_{OOB,Y}$. Herein, $\Delta f_{OOB,X}$ and $\Delta f_{OOB,Y}$ are a frequency range shown in FIG. 12, and $\Delta f_{OOB,X}$ and $\Delta f_{OOB,Y}$ indicate a frequency range to which a spectrum emission mask (SEM) is applied.

Meanwhile, if bands B1 and B5 are subjected to carrier aggregation, an SE requirement for the coexisting between UEs may be proposed as follows.

TABLE 15

| | | Spurious emission (SE) | | |
|---|---|---|---|---|
| E-UTRA CA configuration | Guard band | Frequency range (MHz) | Maximum level (dBm) | MBW (MHz) |
| CA_1A-5A | E-UTRA band 1, 5, 7, 8, 11, 18, 19, 21, 22, 28, 31, 38, 40, 41, 42, 43, 44 | $F_{DL\_low}$-$F_{DL\_high}$ | −50 | 1 |
| | E-UTRA Band 3, 34 | $F_{DL\_low}$-$F_{DL\_high}$ | −27 | 1 |
| | E-UTRA Band 26 | $F_{DL\_low}$-$F_{DL\_high}$ | −50 | 1 |
| | E-UTRA Band 41 | $F_{DL\_low}$-$F_{DL\_high}$ | −40 | 1 |
| | frequency range | 1880-1895 | −15.5 | 5 |
| | frequency range | 1895-1915 | −15.5 | 5 |
| | frequency range | 1900-1915 | | |
| | frequency range | 1915-1920 | +1.6 | 5 |
| | frequency range | 1884.5-1915.7 | −41 | 0.3 |
| | frequency range | 1839.9-1879.9 | −50 | 1 |

Referring to Table 15 above, when a specific UE performs uplink transmission on a band 1 and a band 5 through carrier aggregation, if there is another UE operating in a guard band listed in Table 15, spurious emission caused by transmission of the specific UE is not allowed to exceed a maximum level listed in Table 15 for co-existence with other UEs.

II. Spectrum Emission Mask (SEM)

In case of all combinations shown in Table 14 above, a band gap between two carrier bands is related as: Band Gap>$\Delta f_{OOB,X}+\Delta f_{OOB,Y}$. Therefore, an embodiment of the present specification proposes to apply the existing requirement for the SEM to an individual carrier. That is, the embodiment of the present specification proposes to apply a requirement for a basic SEM as shown in Table 7 even in case of inter-band carrier aggregation.

Meanwhile, a different band combination other than the band combination shown in Table 14 above may be used in the future. In this case, if the band gap between the two carrier bands is related as: Band Gap<$\Delta f_{OOB,X}+\Delta f_{OOB,Y}$, there is a problem in that the existing requirement for the SEM cannot be applied.

In order to solve this problem, another embodiment of the present specification provides the following proposal. First, if the band gap between the two carrier bands is related as: Band Gap<$\Delta f_{OOB,X}+\Delta f_{OOB,Y}$, the another embodiment of the present specification proposes to use an SEM requirement which allows a much higher power spectrum density (PSD) level together with intra-band non-contiguous carrier aggregation (CA).

The above two proposals are summarized as follows.

Proposal 1: If the band gap between the two carrier bands is related as: Band Gap>$\Delta f_{OOB,X}+\Delta f_{OOB,Y}$, the existing requirement for SEM is applied.

Proposal 2: If the band gap between the two carrier bands is related as: Band Gap<$\Delta f_{OOB,X}+\Delta f_{OOB,Y}$, a higher PSD level in two carriers is used in an overlapping region.

III. Adjacent Channel Leakage Ratio (ACLR)

On the other hand, hereinafter, an ACLR requirement in inter-band carrier aggregation is described.

Figure 13A:
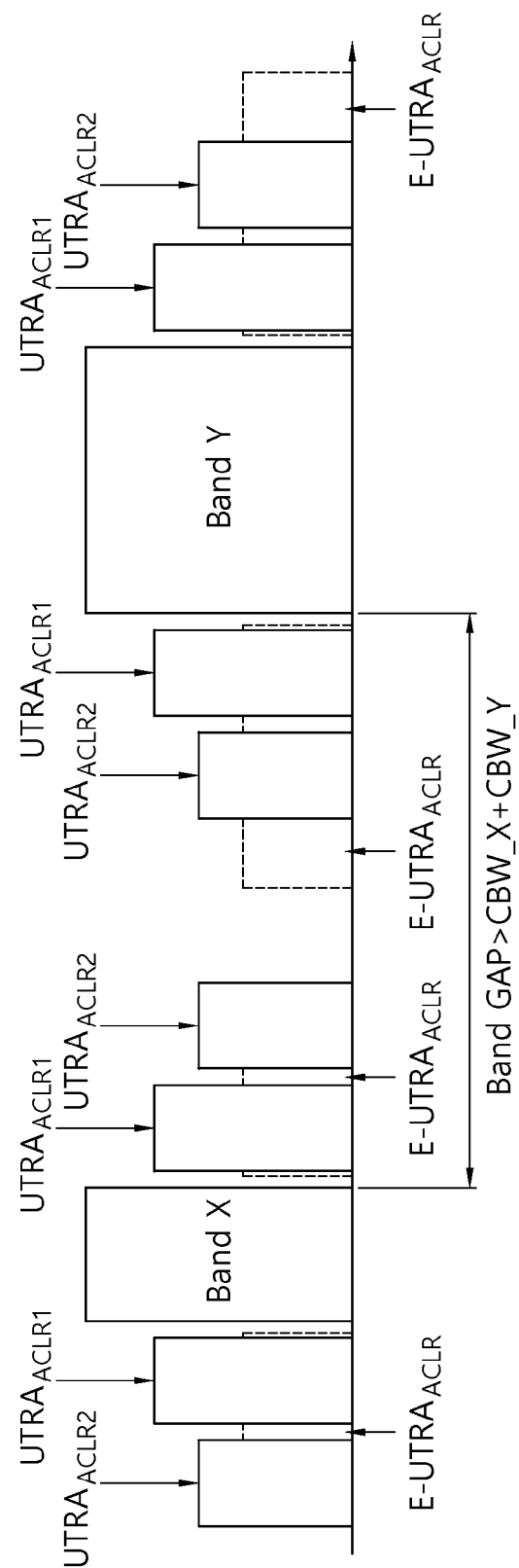
FIG. 13a to FIG. 13c are exemplary views illustrating adjacent channel leakage ratio (ACLR) in inter-band carrier aggregation.
Figure 13B:
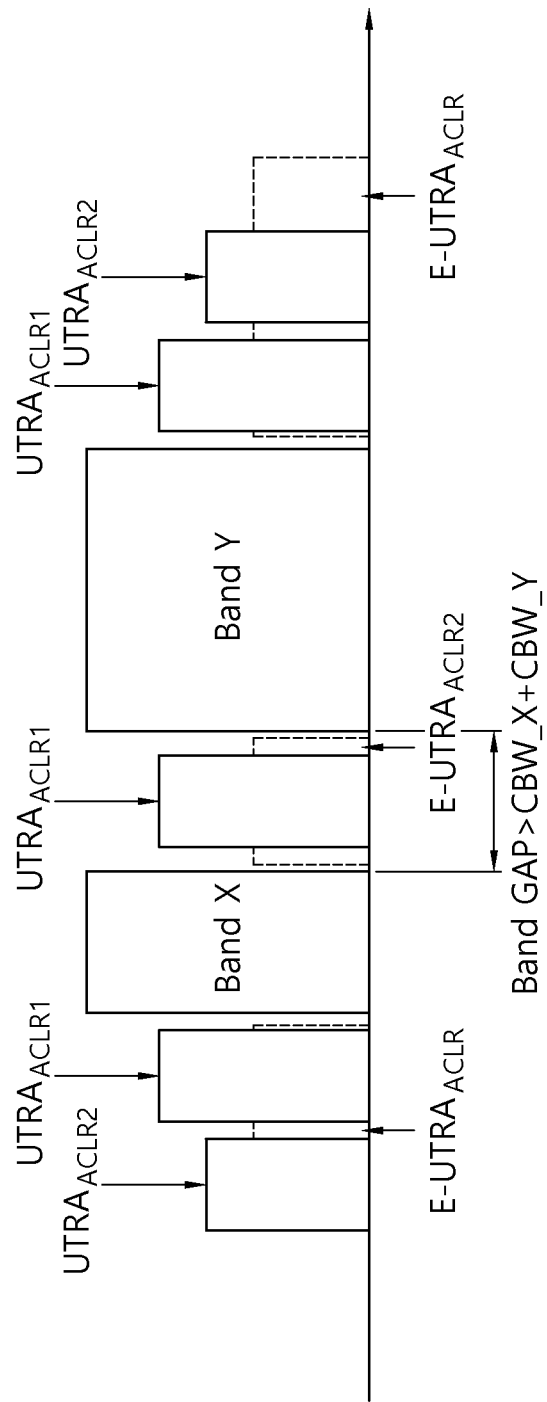
Figure 13C:
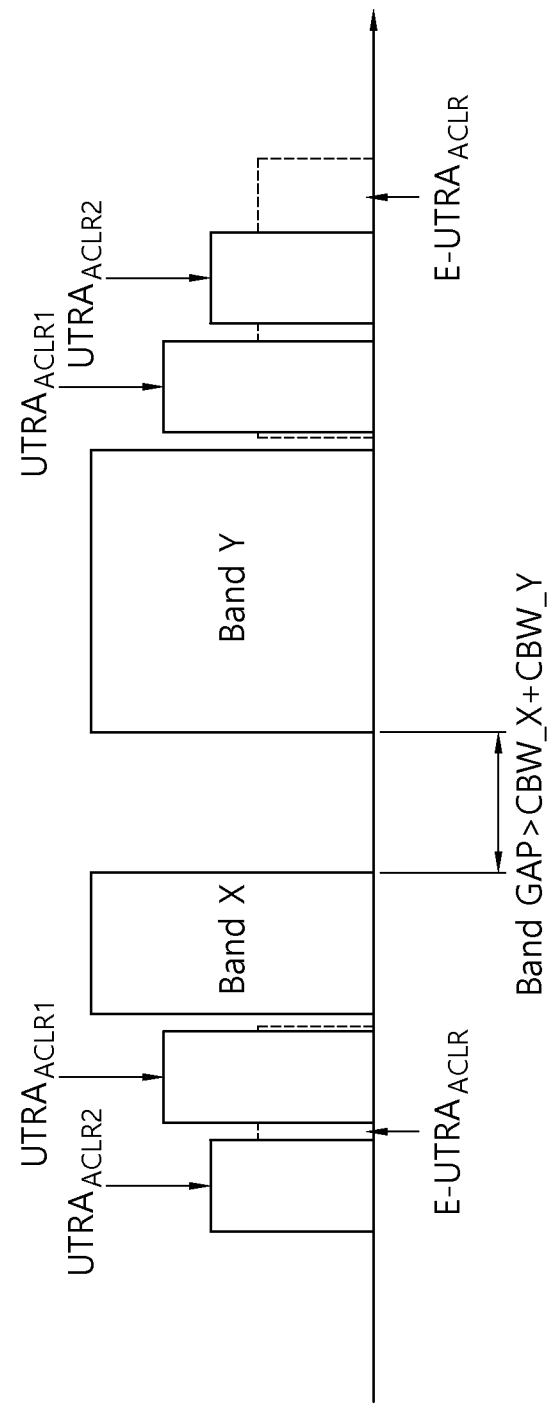

FIG. 13a to FIG. 13c are exemplary views illustrating ACLR in inter-band carrier aggregation.

Referring first to FIG. 13a, it is shown that a band gap between carrier bands is related as: Band Gap>CBW_X+CBW_Y in a situation where a band X and a band Y are subjected to carrier aggregation. The CBW_X denotes a channel bandwidth of the band X shown in the left side, and the CBW_Y denotes a channel bandwidth of the band Y shown in the right side. As such, if Band Gap>CBW_X+CBW_Y, since $UTRA_{ACLR1}$ and $UTRA_{ACLR2}$ shown in the right side of the band X and $UTRA_{ACLR1}$ and $UTRA_{ACLR2}$ shown in the left side of the band Y are located within the band gap, there is no problem. Likewise, if Band Gap>CBW_X+CBW_Y, since E-$UTRA_{ACLR}$ shown in the right side of the band X and E-$UTRA_{ACLR}$ shown in the left side of the band Y are located within the band gap, there is no problem.

Therefore, if a band gap between two bands is greater than a sum of channel bandwidths in inter-band carrier aggregation as described above, another embodiment of the present specification proposes to use the existing ACLR definition in the same manner as the conventional way. In other words, in the inter-band carrier aggregation, E-$UTRA_{ACLR}$ is shown as a ratio of average power on an adjacent channel against average power on an allocated channel bandwidth of a component carrier (CC). Accordingly, if the band gap between the two bands is greater than the sum of the channel bandwidths in the inter-band carrier aggregation, the another embodiment of the present specification proposes to directly apply the existing ACLR requirement. That is, it is proposed that E-$UTRA_{ACLR}$ is defined for each CC, and Table 8 showing the existing ACLR requirement is directly applied to each CC.

Meanwhile, if CBW_X<Band Gap<+CBW_Y as can be seen from FIG. 13b, or Band Gap<Min(CBW_X, CBW_Y) (that is, if the band gap is less than a bandwidth which is narrower between CBW_X and CBW_Y), since all of $UTRA_{ACLR1}$, $UTRA_{ACLR2}$, and E-$UTRA_{ACLR}$ are not included in the band gap, there may be a problem.

Therefore, if the band gap between the two bands is less than at least one channel bandwidth in the inter-band carrier aggregation as described above, another embodiment of the present specification proposes to ignore the existing ACLR requirement The above two proposals are summarized as follows.

Proposal 3: If the band gap between the two carrier bands is related as: Band Gap>Sum of Channel Bandwidth, the existing requirement for ACLR is applied.

Proposal 4: if the band gap between the two carrier bands is related as: Band Gap<Any One Channel Bandwidth, the existing requirement for ACLR is ignored.

Alternatively, when the band gap is denoted by $BW_{GAP}$, if 5 MHz $BW_{GAP}$, $UTRA_{ACLR1}$ may be required within the band gap. Further, if 15 MHz $BW_{GAP}$, $UTRA_{ACLR1}$ and $UTRA_{ACLR2}$ may be required within the band gap. Meanwhile, a power measurement band of an adjacent band of $E\text{-}UTRA_{ACLR}$ must be the same as an adjacent channel bandwidth. In this case, if the band gap is less than another channel bandwidth, $E\text{-}UTRA_{ACLR}$ may not be set for the band gap as to the channel bandwidth. Further, if the band gap is less than any one of the two channel bandwidths, $E\text{-}UTRA_{ACLR}$ may not be set for the band gap as to the channel bandwidth.

IV. Requirement of Transmit Inter-Modulation

Inter-modulation (IM) is also referred to as inter-modulation distortion (IMD), and implies that, if a carrier of a first band and a carrier of a second band are simultaneously input to a non-linear amplifier, the carriers are combined with each other to generate an unwanted signal component. It is preferable to suppress the generation of the IMD component, that is, the unwanted component.

However, there is no effective test method capable of confirming that the IM component or the IMD component is generated by inter-band carrier aggregation.

Therefore, a test method of allocating interference to an inside-gap and a test method of allocating interference to an outside-gap are proposed hereinafter as the effective test method.

First, in the test method of allocating the interference to the inside-gap, a positive interference signal is inserted to a low band carrier (e.g., CC1), and a negative interference signal is inserted to a high band signal (e.g., CC2). In this case, the negative interference signal is allocated to the right side of a band X, and the positive interference signal is allocated to the left side of a band Y.

Next, in the test method of allocating the interference to the outside-gap, the negative interference signal is inserted to the left side of the band X, and the positive interference signal is inserted to the right side of the band Y.

In addition, the test method of allocating the interference to the inside-gap and the test method of allocating the interference to the outside-gap may be performed on each of Case A, Case B, and Case C depending on a size of a band gap. Case A is for a situation of: Band Gap$\geq$2*(CBW_X+CBW_Y), Case B is for a situation of: 2*Min(CBW_X, CBW_Y)$\leq$Band Gap<2*(CBW_X+CBW_Y), and Case C is for a situation of: Band Gap<2*Min(CBW_X, CBW_Y). This will be described hereinafter with reference to the drawings.

Figure 14A:
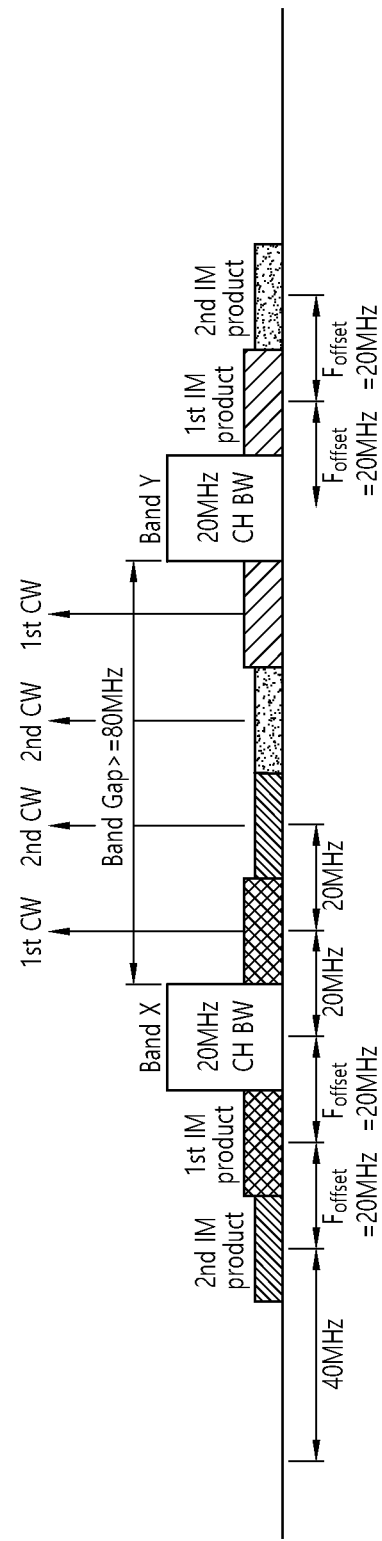
FIG. 14a and FIG. 14b exemplify test methods for Case A, i.e., Band Gap 2*(CBW_X+CBW_Y).
Figure 14B:
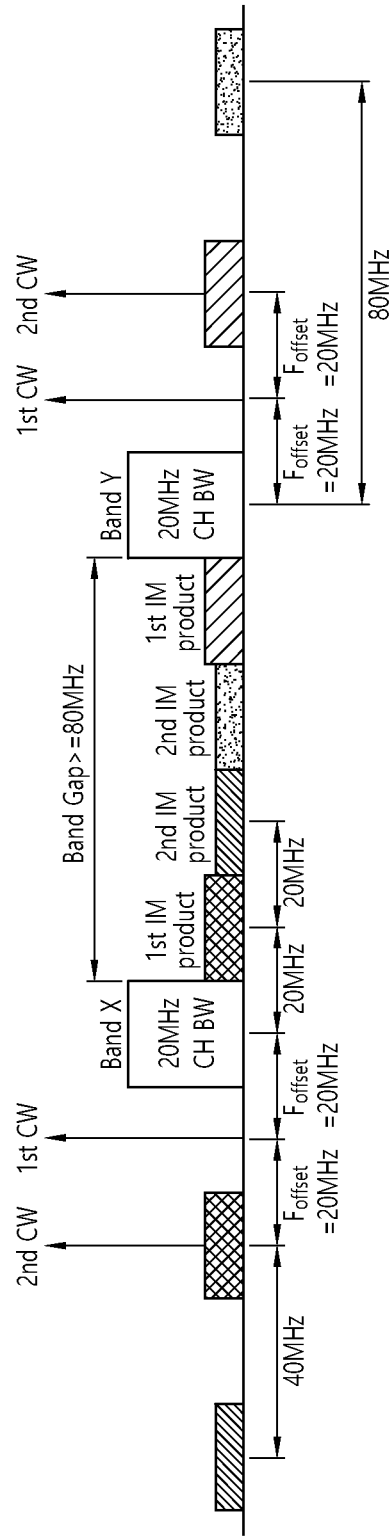

FIG. 14a and FIG. 14b exemplify test methods for Case A, i.e., Band Gap$\geq$2*(CBW_X+CBW_Y).

Referring first to FIG. 14a, a test for allocating interference to an inside-gap is shown in a situation of Case A, that is, Band Gap$\geq$2*(CBW_X+CBW_Y). The test is performed by inserting interference signals (e.g., $1^{st}$ CW and $2^{nd}$ CW) to the right side of the band X, and by inserting interference signals (e.g., $1^{st}$ CW and $2^{nd}$ CW) to the left side of the band Y.

Next, referring to FIG. 14b, a test for allocating interference to an outside-gap is shown in a situation of Case A, that is, Band Gap$\geq$2*(CBW_X+CBW_Y). The test is performed by inserting interference signals (e.g., $1^{st}$ CW and $2^{nd}$ CW) to the left side of the band X, and by inserting interference signals (e.g., $1^{st}$ CW and $2^{nd}$ CW) to the right side of the band Y.

Figure 15A:
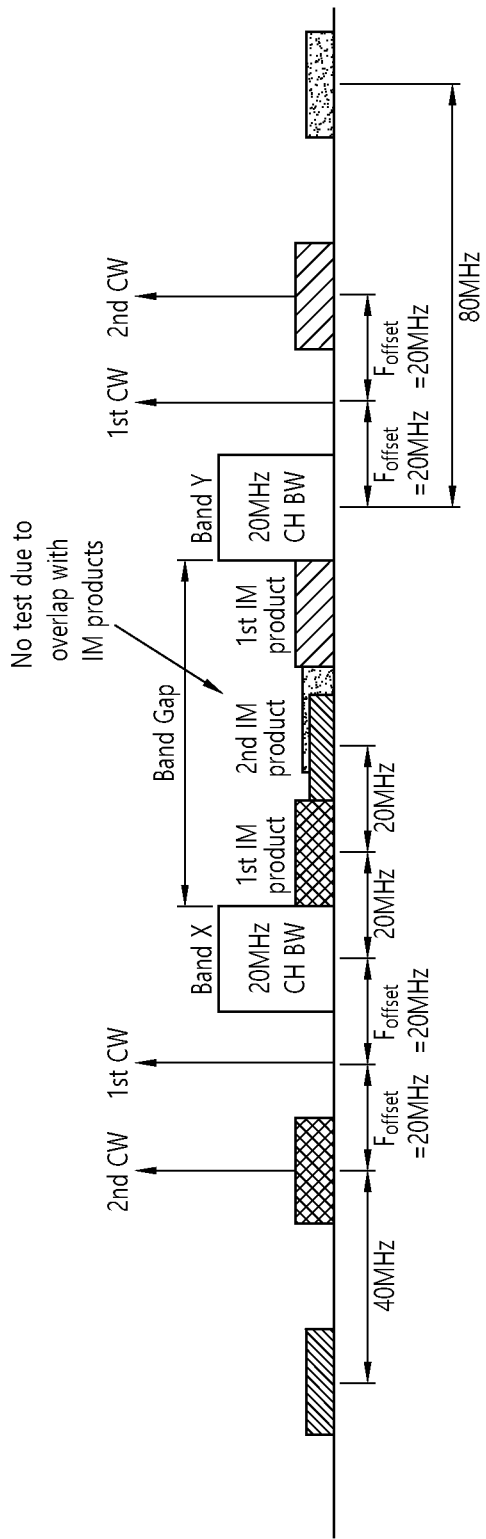
Figure 15B:
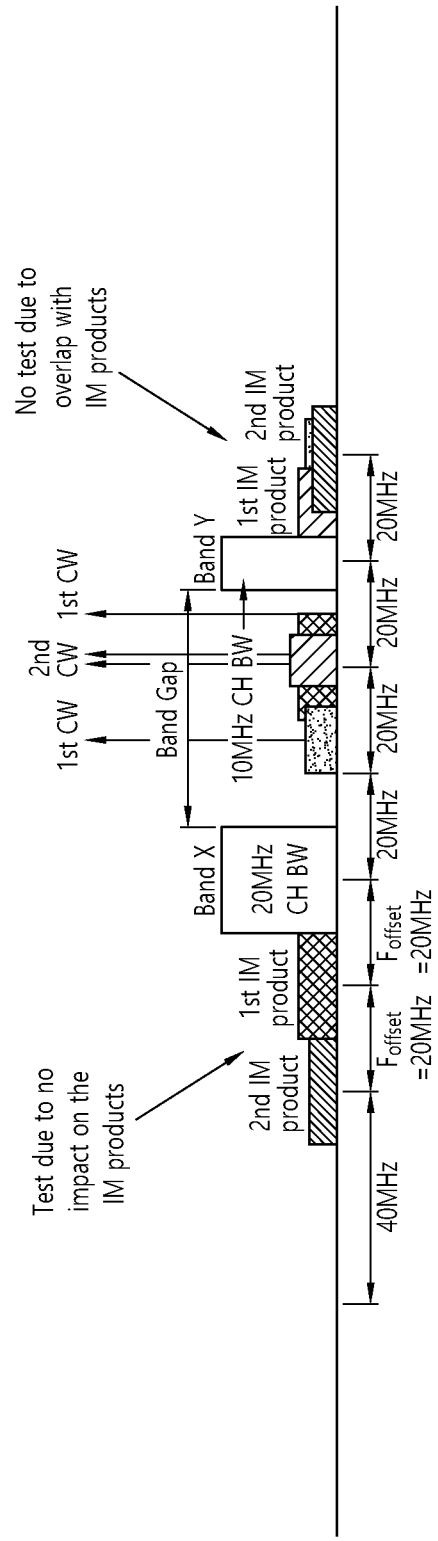

FIG. 15a to FIG. 15c exemplify test methods for Case B, i.e., 2*Min(CBW_X, CBW_Y)$\leq$Band Gap<2*(CBW_X+CBW_Y).

Referring to FIG. 15a, a test for allocating interference to an outside-gap is shown in a situation of: 2*Min(CBW_X, CBW_Y)$\leq$Band Gap<2*(CBW_X+CBW_Y). The test is performed by inserting interference signals (e.g., $1^{st}$ CW and $2^{nd}$ CW) to the left side of the band X, and by inserting interference signals (e.g., $1^{st}$ CW and $2^{nd}$ CW) to the right side of the band Y. In this case, the test is not performed around a portion in which a second IM component overlaps in an inside-gap.

Referring to FIG. 15b, a test for allocating interference to an inside-gap is shown in a situation of: 2*Min(CBW_X, CBW_Y)$\leq$Band Gap<2*(CBW_X+CBW_Y). The test is performed by inserting interference signals (e.g., $1^{st}$ CW and $2^{nd}$ CW) to the right side of the band X, and by inserting interference signals (e.g., $1^{st}$ CW and $2^{nd}$ CW) to the left side of the band Y. In this case, the test is not performed around a portion in which a first IM component and a second IM component overlap in the inside-gap. Likewise, the test is not performed around a portion in which the first IM component and the second IM component overlap in an outside-gap.

Referring to FIG. 15c, a test for allocating interference to an inside-gap is shown in a situation of: 2*Min(CBW_X, CBW_Y)$\leq$Band Gap<2*(CBW_X+CBW_Y). In this case, the test is not performed around a portion in which a first IM component and a second IM component overlap in the inside-gap. Likewise, the test is not performed around a portion in which the first IM component and the second IM component overlap in an outside-gap.

Figure 16A:
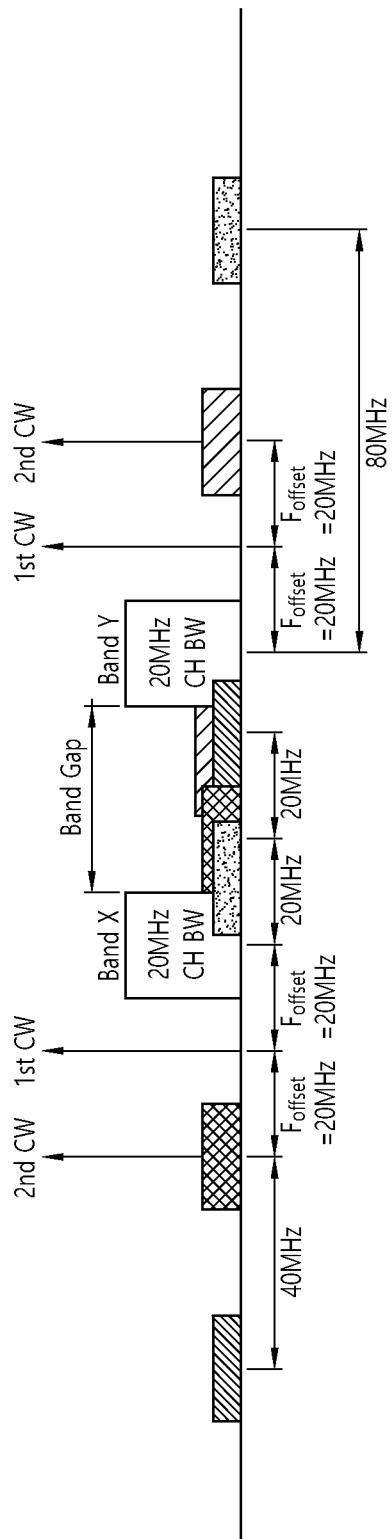

FIG. 16a and FIG. 16b exemplify test methods for Case C, i.e., Band Gap<2*Min(CBW_X, CBW_Y).

Referring to FIG. 16a, a test for allocating interference to an outside-gap is shown in a situation of: Band Gap<2*Min(CBW_X, CBW_Y). The test is performed by inserting interference signals (e.g., $1^{st}$ CW and $2^{nd}$ CW) to the left side of the band X, and by inserting interference signals (e.g., $1^{st}$ CW and $2^{nd}$ CW) to the right side of the band Y. In this case, the test is not performed around a portion in which a first IM component and a second IM component overlap in an inside-gap.

Referring to FIG. 16b, a test for allocating interference to an inside-gap is shown in a situation of: Band Gap<2*Min(CBW_X, CBW_Y). The test is performed by inserting interference signals (e.g., $1^{st}$ CW and $2^{nd}$ CW) to the right side of the band X, and by inserting interference signals (e.g., $1^{st}$ CW and $2^{nd}$ CW) to the left side of the band Y. In this case, the test is not performed around a portion in which a first IM component and a second IM component overlap in the inside-gap. Likewise, the test is not performed around a portion in which the first IM component and the second IM component overlap in an outside-gap.

As described above, a test method may be proposed to analyze an IM component in inter-band carrier aggregation. This is summarized as follows.

Proposal 5: The test is performed in a distinctive manner according to a size of a band gap in inter-band carrier aggregation (i.e., carrier aggregation of a first band and carrier aggregation of a second band). In this case, a test for allocating interference to an inside-gap and a test for allocating interference to an outside-gap are performed sequentially.

Proposal 6: If Band Gap≥2*(CBW_X+CBW_Y), a test for allocating interference to an inside-gap and a test for allocating interference to an outside-gap are performed sequentially.

Proposal 7: If 2*min(CBW_X, CBW_Y)<Band Gap)<2*(CBW_X+CBW_Y), a test for allocating interference to an inside-gap and a test for allocating interference to an outside-gap are performed only for a portion which is not affected by an IM component.

Proposal 8: If 2*min(CBW_X, CBW_Y)>Band Gap, a test for allocating interference to an outside-gap is performed only for a portion which is not affected by an IM component.

Figure 17:
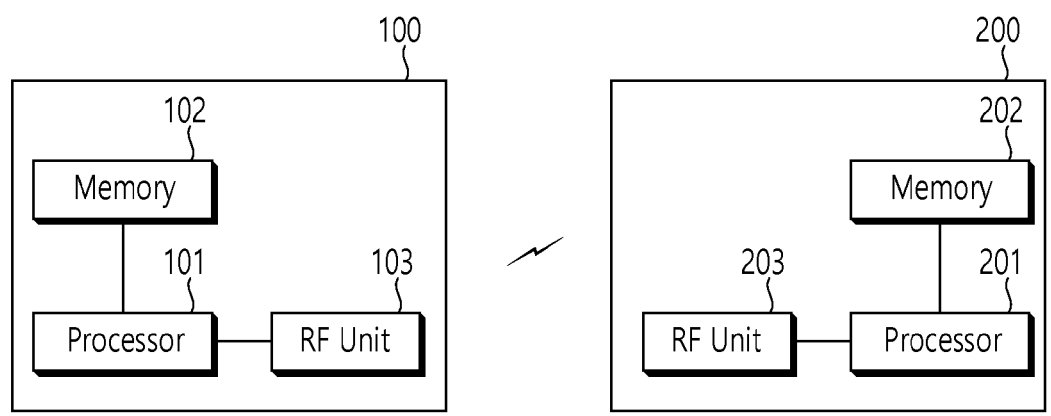
FIG. 17 is a block diagram of a wireless communication system according to an embodiment of the present invention.

The aforementioned embodiments of the present invention can be implemented through various means. For example, the embodiments of the present invention can be implemented in hardware, firmware, software, combination of them, etc. Details thereof will be described with reference to the drawing FIG. 17 is a block diagram of a wireless communication system according to an embodiment of the present invention.

A BS 200 includes a processor 201, a memory 202, and a radio frequency (RF) unit 203. The memory 202 is coupled to the processor 201, and stores a variety of information for driving the processor 201. The RF unit 203 is coupled to the processor 201, and transmits and/or receives a radio signal. The processor 201 implements the proposed functions, procedures, and/or methods. In the aforementioned embodiment, an operation of the BS may be implemented by the processor 201.

A wireless device 100 includes a processor 101, a memory 102, and an RF unit 103. The memory 102 is coupled to the processor 101, and stores a variety of information for driving the processor 101. The RF unit 103 is coupled to the processor 101, and transmits and/or receives a radio signal. The processor 101 implements the proposed functions, procedures, and/or methods. In the aforementioned embodiment, an operation of the wireless device may be implemented by the processor 101.

The processor may include Application-specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting an uplink signal according to a spectrum emission mask (SEM), the method performed by a user equipment (UE) configured to use inter-band carrier aggregation (CA) and comprising:
determining whether to apply only one SEM allowing a higher power spectral density (PSD) among a first SEM of a first carrier and a second SEM of a second carrier according to whether the first SEM is overlapped in a frequency region with the second SEM; and
transmitting uplink signals on the carriers according to the applied one SEM.

2. The method of claim 1, wherein:
when the first SEM is overlapped with the second SEM, the one SEM allowing the higher PSD is applied among the first SEM and the second SEM, and
when the first SEM is not overlapped with the second SEM, both the first SEM and the second SEM are applied.

3. The method of claim 1, wherein if the first carrier corresponds to 3GPP standard based E-UTRA band 1 and if the second carrier corresponds to 3GPP standard based E-UTRA band 5, then a maximum level of spurious emission is −50 dBm for protecting other UE using at least one of 3GPP standard based E-UTRA bands 1, 3, 5, 7, 8, 22, 28, 31, 34, 38, 40, 42 and 43 in order to apply a UE-to-UE coexistence requirement.

4. The method of claim 1, wherein if the first carrier corresponds to 3GPP standard based E-UTRA band 1 and if the second carrier corresponds to 3GPP standard based E-UTRA band 5, then a maximum level of spurious emission is −27 dBm for protecting other UE using a 3GPP standard based E-UTRA band 26 in order to apply a UE-to-UE coexistence requirement.

5. A user equipment for transmitting an uplink signal according to a spectrum emission mask (SEM), the user equipment comprising:
a radio frequency (RF) unit configured to transmit uplink signals on the carriers if the RF unit of the UE is configured to use inter-band carrier aggregation (CA), and
a processor configured to control the RF unit,
wherein the processor applies only one SEM allowing a higher power spectral density (PSD) among a first SEM of a first carrier and a second SEM of a second carrier according to whether the first SEM is overlapped in a frequency region with the second SEM.

6. The user equipment of claim 5, wherein:
when the first SEM is overlapped with the second SEM, the one SEM allowing the higher PSD is applied among the first SEM and the second SEM, and
when the first SEM is not overlapped with the second SEM, both the first SEM and the second SEM are applied.

7. The user equipment of claim 5, wherein if the first carrier corresponds to 3GPP standard based E-UTRA band 1 and if the second carrier corresponds to 3GPP standard based E-UTRA band 5, then a maximum level of spurious emission is −50 dBm for protecting other UE using at least one of 3GPP standard based E-UTRA bands 1, 3, 5, 7, 8, 22, 28, 31, 34, 38, 40, 42 and 43 in order to apply a UE-to-UE coexistence requirement.

8. The user equipment of claim 5, wherein if the first carrier corresponds to 3GPP standard based E-UTRA band 1 and if the second carrier corresponds to 3GPP standard based E-UTRA band 5, then a maximum level of spurious emission is −27 dBm for protecting other UE using a 3GPP standard based E-UTRA band 26 in order to apply a UE-to-UE coexistence requirement.

\* \* \* \* \*